United States Patent [19]

Misaki et al.

[11] Patent Number: 4,979,088
[45] Date of Patent: Dec. 18, 1990

[54] INTEGRATED HIGH VOLTAGE GENERATING SYSTEM

[75] Inventors: Hirozumi Misaki, Suita; Yasuyuki Okada, Takatsuki, both of Japan

[73] Assignee: Matsushita Electric Industrial Co., Ltd., Osaka, Japan

[21] Appl. No.: 457,167

[22] Filed: Dec. 26, 1989

[30] Foreign Application Priority Data

Dec. 26, 1988 [JP] Japan .................... 63-328257

[51] Int. Cl.⁵ .................... H02M 3/155; H02M 3/018
[52] U.S. Cl. ...................... 363/060; 307/110
[58] Field of Search ........... 363/59, 60, 61; 320/1; 307/110

[56] References Cited

U.S. PATENT DOCUMENTS

| | | | |
|---|---|---|---|
| 3,790,812 | 2/1974 | Fry | 363/60 |
| 3,942,047 | 3/1976 | Buchanan | 363/60 |
| 4,061,929 | 12/1977 | Asano | 363/60 |
| 4,621,315 | 11/1986 | Vaughn et al. | 363/60 |
| 4,839,787 | 6/1989 | Kojima et al. | 363/60 |

Primary Examiner—Peter S. Wong
Attorney, Agent, or Firm—Wenderoth, Lind & Ponack

[57] ABSTRACT

The invention discloses an integrated high voltage generating system possessing a charge pump for boosting stepwise the potential of an output node sequentially from the value of a first supply voltage to the value of a second supply voltage in synchronism with the clock pulses applied through a capacitor, wherein the second supply voltage is supplied to the gate electrode of the output MOS transistor connected between the output node of the charge pump and the output terminal. In this constitution, since the gate potential of the output MOS transistor is fixed at the valve of the second supply voltage, the potential fluctuation due to clock pulses does not appear on the output voltage taken out of the output terminal.

5 Claims, 5 Drawing Sheets

INTEGRATED HIGH VOLTAGE GENERATING SYSTEM

BACKGROUND OF THE INVENTION

The present invention relates to an integrated high voltage generating system used in high voltage pulse generating circuit of semiconductor memory device or the like.

In an EEPROM or the like using MNOS transistors, in order to write and erase data in and from MNOS transistors, it is necessary to apply a high voltage of about 15 V to the gate electrode. Usually, semiconductor device such as EEPROM, a power supply of about 5 V is used as an operating power source. Accordingly, a high voltage pulse generating circuit is incorporated into an integrated circuit of EEPROM, and the input supply voltage of about 5 V is boosted by this high voltage pulse generating circuit to a high voltage of 15 to 20 V.

Such high voltage pulse generating circuit is composed of, as disclosed in the Japanese patent application No. 62-122931 or the U.S. Pat. No. 4,839,787, a boosting charge pump connecting multiple stages of pump made of a diode element and a capacitor, high voltage generating system for applying the high voltage supplied from the charge pump into the gate electrodes of MNOS transistors of EEPROM, and others.

Figure 3:
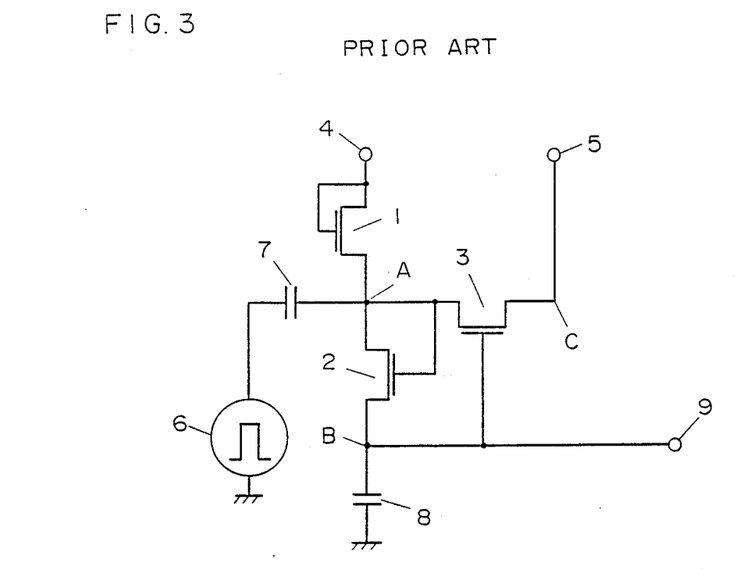
FIG. 3 is a circuit diagram of a conventional integrated high voltage generating system.

FIG. 3 shows a one-stage portion (unit circuit) of a conventional integrated high voltage generating system used in application of high voltage to gate electrodes of MNOS transistors of EEPROM.

In FIG. 3, a first supply voltage of about 5 V, for example, is applied to a first power source input terminal 4. At a second power source input terminal 5, a second supply voltage Vp of about 15 V, which is boosted, for example, by a charge pump as disclosed in the Japanese patent application No. 62-122931 or the U.S. Pat. No. 4,839,787, is applied. The first supply voltage is fed to a node A through a diode-connected first MOS transistor (hereinafter called first transistor) 1. The second supply voltage Vp is fed to the node A which is the input node of the first supply voltage through a node C and a third MOS transistor (hereinafter called third transistor) 3. On the other hand, at the node A, clock pulses having a high frequency of several MHz and an amplitude VDD nearly equal to the first supply voltage (5 V in this case) are supplied from a clock pulse source 6 by way of a first capacitor 7 as a coupling capacity. The voltage of the node A supplied to a node B which is the output node through a diode-connected second MOS transistor (hereinafter called second transistor). Between the node B and the reference potential point, a second capacitor 8 is connected as a load capacity, and the voltage at the upper end of the second capacitor 8 is delivered from an output terminal 9 as an output voltage after boosting. Meanwhile, the gate electrode of the third transistor 3 is connected to the node B.

The operation of the integrated high voltage generating system in FIG. 3 is explained below.

The basic operating principle of the MOS transistor is known as follows. Supposing the voltages of the gate, drain and source electrodes of a MOS transistor to be VG, VD and VS, respectively, when $VD \geq VG$, it follows that $$VS = VG - (VT + \Delta VT) \quad (1)$$

where VT is the threshold voltage of the MOS transistor, and $\Delta VT$ is the back bias effect.

In the following explanation, the sum of $VT + \Delta VT$ is assumed to be 2 V.

The first supply voltage (5 V) applied to the first power source terminal 4 is supplied to the node A through the first transistor 1, and hence the potential VA at the node A is obtained as follows from equation (1):

$$\begin{aligned} VA &= VG - (VT + \Delta VT) \\ &= 5V - 2V \\ &= 3V \end{aligned} \quad (2)$$

However, since clock pulses of amplitude VDD (5 V) are applied to the node A from the clock pulse source 6, the potential VA at the node A is raised to about 8 V at the moment the clock pulses rise up. This 8 V potential VA is supplied to the node B through the second transistor 2, and hence the potential VB at the node B is obtained as follows from equation (1):

$$\begin{aligned} VB &= VG - (VT + \Delta VT) \\ &= 8V - 2V \\ &= 6V \end{aligned} \quad (3)$$

At the rise moment of a clock pulse, the third transistor 3 is turned off, but, as mentioned above, along with the rise of a clock pulse, the second transistor 2 is turned on, and along with the fall of a clock pulse, the second transistor 2 is turned off. At this time, the potential VB at the node B is raised to about 6 V by the electric charge accumulated in the second capacitor 8, and therefore the third transistor 3 is turned on. As a result, the second supply voltage Vp (15 V) applied to the second power source input terminal 5 is supplied to the node A through the third transistor 3. At this time, from equation (1), the potential VA at the node A becomes as follows:

$$\begin{aligned} VA &= VG - (VT + \Delta VT) \\ &= 6V - 2V \\ &= 4V \end{aligned} \quad (4)$$

As clear from the comparison between equation (1) and equation (4), the potential VA at the node A was 3 V before the rise of a clock pulse, and it is boosted to 4 V when the clock pulse once rises and then falls. In this period, the potential VB at the node B is boosted to 6 V, and this voltage is delivered from the output terminal 9 as the output voltage.

Thus, in the integrated high voltage generating system in FIG. 3, the second and third transistors 2, 3 are alternately switched repeatedly in synchronism with the clock pulses, and the potential VA at the node A is boosted stepwise sequentially, and in response the potential VB at the node B is also boosted stepwise sequentially. As a result, a stepwise boosted output voltage is obtained from the output terminal 9. The output voltage from the output terminal 9 is finally boosted to the same potential as the second supply voltage (15 V), and this voltage is applied to the gate electrodes of the MNOS transistors composing the EEPROM (not shown).

As evident from the description herein, in FIG. 3, a charge pump is composed of the first, second and third transistors 1, 2 and 3, and the second capacitor 8, and the potential at the node B (output node) is boosted stepwise sequentially from the first supply voltage (5 V) to the second supply voltage Vp (15 V) in synchronism with the clock pulses applied through the first capacitor 7.

Incidentally, when a power source having a sufficiently large current sink capacity is connected to the second power source input terminal 5 in FIG. 3, the potential VC of the node C is almost fixed at the value of the second supply voltage Vp. However, when a charge pump as disclosed in the Japanese patent application No. 62-122931 or the U.S. Pat. No. 4,839,787 is connected to the second power source input terminal 5, the following problem may occur.

The capacitors composing the stages of such charge pump have usually several 10 pF, and are capable of passing electric currents of only several microamperes, and therefore the current sink capacity is small. Besides, when the number of bits of the EEPROM increases, the leak current also increases, which also causes to lower the current sink capacity of the charge pump. When a power source with such small current sink capacity is connected to the second power source input terminal 5 in FIG. 3, the potential VC of the node C is swept away by the clock pulses supplied through the first capacitor 7.

Figure 4:
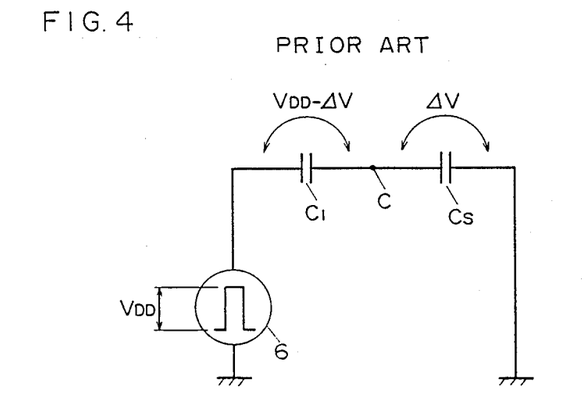
FIG. 4 is an equivalent circuit diagram of FIG. 3.

Meanwhile, supposing the pulse amplitude of the clock pulse source 6 to be VDD, the fluctuation amplitude of potential VC of node C to be $\Delta V$, the capacity of the first capacitor 7 to be C1, and the floating capacity of the node C to be Cs, the equivalent circuit in FIG. 3 becomes as shown in FIG. 4. In FIG. 4, assuming that the electric charge Q occurring in the first capacity is entirely transferred to the node C, it follows that $$Q = C1(VDD - \Delta V) = Cs \cdot \Delta V \tag{5}$$

From equation (5), we obtain $$\frac{Cs}{C1} = \frac{VDD - \Delta V}{\Delta V} \tag{6}$$

$$= \frac{VDD}{\Delta V} - 1$$

where $\frac{VDD}{\Delta V} \geq 1$

As stated above, in the integrated high voltage generating system shown in FIG. 3, the peak value of the amplitude of the potential Vc of the node C is held in the second capacitor 8 by the switching action of the second and third transistors 2, 3, and becomes the potential of the node B (output node). The potential at this node B is delivered from the output terminal 9 as the output voltage. In this process, the pulse amplitude waveform of the clock pulses is superposed on the potential VC of the node C, and a potential fluctuation of $\Delta V$ occurs. Accordingly, the output voltage taken out of the output terminal 9 must be, in principle, a constant voltage determined by the second supply voltage Vp, but the output voltage actually obtained is the voltage determined by (Vp+$\Delta V$), that is, $\Delta V$ higher than the second supply voltage Vp.

Figure 5:
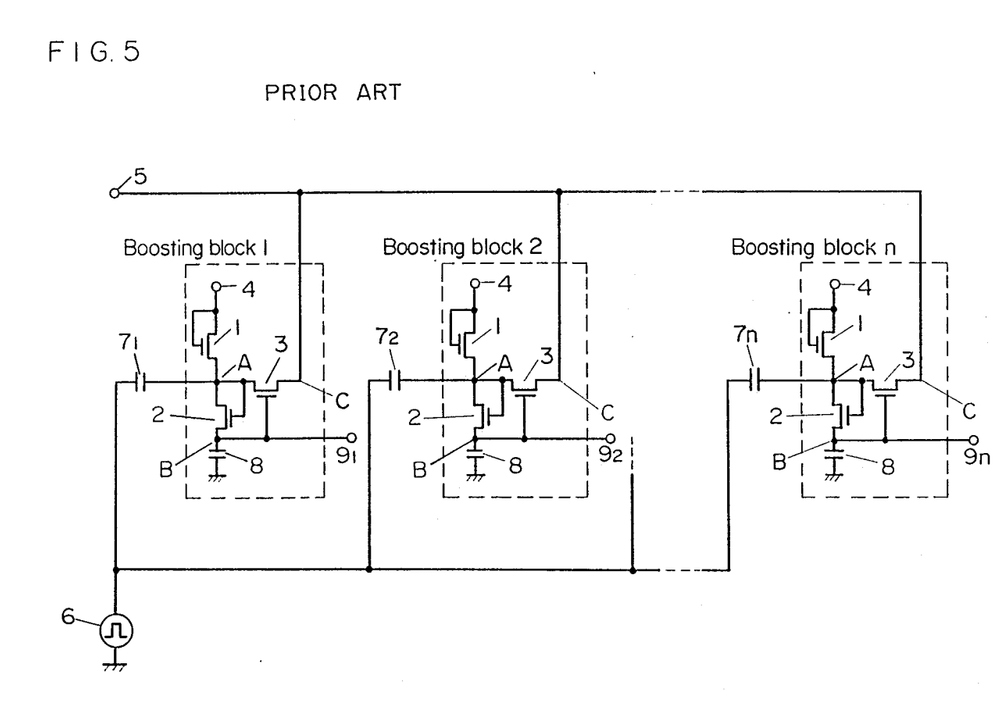
FIG. 5 is a circuit diagram showing other conventional integrated high voltage generating system.

This problem further leads to the following problem when a plurality of integrated high voltage generating system shown in FIG. 3 are connected as shown in FIG. 5.

In FIG. 5, the boosting blocks 1 to n correspond to the integrated high voltage generating system shown in FIG. 3, individually. Supposing the fluctuation amplitude of the potential VC of the node C to be $\Delta Vn$ ($\Delta Vn$ denotes the fluctuation amplitude when n boosting blocks are connected), the capacity value of the first capacitors 7l to 7n to be C11, C12, ..., C1n, and the floating capacity of the node C to be Csn (Csn denotes the floating capacity when n stages are connected), it follows from equation (5) that $$\sum_{M=1}^{n} C1M(VDD - \Delta Vn) = Csn \cdot \Delta Vn \tag{7}$$

From equation (7), we obtain $$\frac{Csn}{\sum_{M=1}^{n} C1M} = \frac{VDD}{\Delta Vn} - 1 \tag{8}$$

From equation (8), it is known that when C1M increases, the value of the left side becomes small, and hence the value of the right side also becomes small. In other words, $\Delta Vn$ approaches VDD. That is, the fluctuation amplitude $\Delta Vn$ of the potential VC of the node C approaches the amplitude VDD of the clock pulses.

Figure 6A:
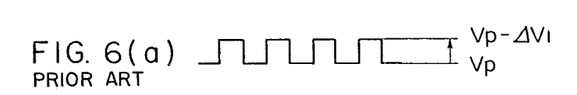
FIGS. 6a to 6c are voltage waveform diagrams for explaining the operation of FIG. 5.
Figure 6B:
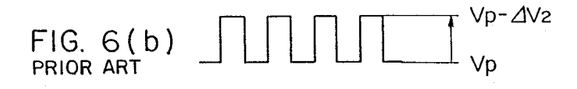
Figure 6C:
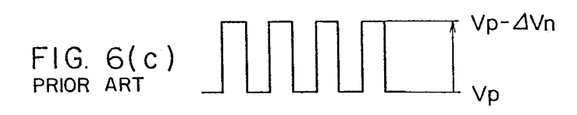

In this way, when a plurality of boosting blocks are connected as shown in FIG. 5, the number of first capacitors 7l to 7n connected to the common clock pulse source 6 increases, and therefore the fluctuation amplitude $\Delta Vn$ of the node C increases. As a result, the output voltage obtained from the output terminals 9l to 9n of the boosting blocks 1 to n changes to Vp+$\Delta Vn$. As stated above, since $\Delta Vn$ is the value determined by the number of stages of the boosting blocks, when there is one boosting block (that is, in the composition shown in FIG. 3), the output voltage taken out of the output terminal 9 is the voltage determined by Vp+$\Delta V1$ as shown in FIG. 6 (a), and when there are two boosting blocks, the output voltage of two boosting blocks is the voltage determined by Vp+$\Delta V2$ as shown in FIG. 6 (b), and when there are n boosting blocks, the output voltage of all boosting blocks is the voltage determined by Vp+$\Delta Vn$ as shown in FIG. 6 (c). Hence, as stated above, the maximum value of $\Delta Vn$ is a value close to the amplitude VDD of the clock pulses.

When using the integrated high voltage generating system as shown in FIG. 5 as the high voltage pulse generating circuit of EEPROM, it is necessary to assemble plural integrated high voltage generating systems in a different number of stages depending on the number of bits. However, since the output voltage of the plural integrated high voltage generating systems varies depending on the number of stages of the boosting blocks, the second supply voltage Vp supplied from the charge pump (not shown) cannot be correctly transmitted to the gate electrodes of the MNOS transistors (not shown).

It is hence a first object of the invention to prevent an integrated high voltage generating system capable of eliminating the influences of voltage fluctuations due to clock pulses.

It is a second object of the invention to present an integrated high voltage generating system capable of preventing voltage fluctuations due to clock pulses from appearing on the output voltages of boosting blocks even when a plurality of boosting blocks are connected and clock pulses are applied to plural boosting blocks from a common clock pulse source through individual capacitors.

SUMMARY OF THE INVENTION

In sum, the integrated high voltage generating system of the invention comprises a charge pump for boosting stepwise the potential of the output node sequentially from the value of a first supply voltage to the value of a second supply voltage in synchronism with the clock pulses applied through a capacitor, wherein a second supply voltage is applied to the gate electrode of the output MOS transistor connected between the charge pump output node and the output terminal.

In this constitution, the gate potential of the output MOS transistor is fixed at the second supply voltage. Accordingly, even if the current sink capacity of the second power source is small and, as a result, a current fluctuation due to clock pulses should occur in the output node of the charge pump, the output voltage taken out of the output terminal is free from the influence of the potential fluctuation by the clock pulses. Hence, when the integrated high voltage generating system of the invention is incorporated into a semiconductor device, an extremely stable operating voltage may be supplied to the internal circuit of the semiconductor device.

These and other features of the invention, as well as the effects and advantages thereof, will be better understood and appreciated from the following detailed description taken in conjunction with the drawings.

DETAILED DESCRIPTION OF THE INVENTION

Figure 1:
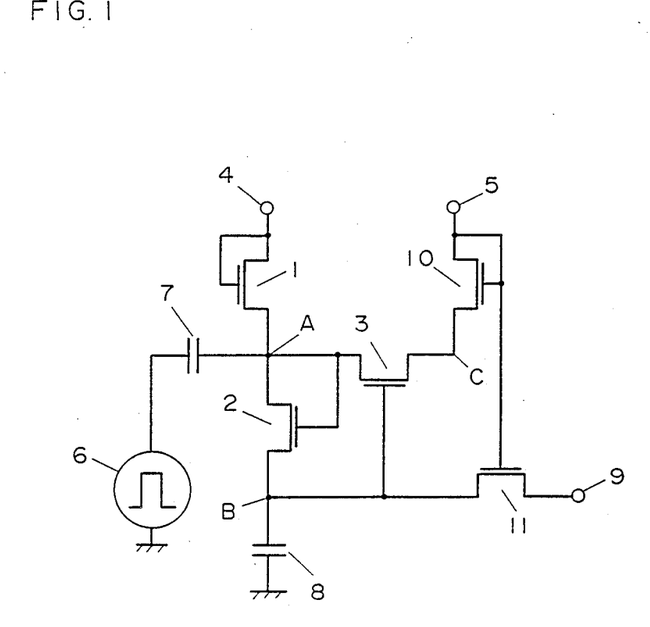
FIG. 1 is a circuit diagram of an integrated high voltage generating system in a first embodiment of the invention.

Referring now to FIG. 1, a first embodiment of the invention is described in detail below.

FIG. 1 shows a one-stage portion (unit circuit) of an integrated high voltage generating system.

In FIG. 1, a first supply voltage of about 5 V is applied to a first power source input terminal 4. At a second power source input terminal 5, a second supply voltage Vp of about 15 V boosted by a charge pump as disclosed in the Japanese patent application no. 62-122931 or the U.S. Pat. No. 4,839,787 is applied. The first supply voltage is supplied to a node A which is an input node of the first supply voltage through a diode-connected first MOS transistor (hereinafter called first transistor) 1. The second supply voltage Vp is fed to a node A through a diode-connected fourth MOS transistor (hereinafter called fourth transistor) 10, a node C which is an input node of the second supply voltage, and a third MOS transistor (hereinafter called third transistor) 3. On the other hand, at the node A, clock pulse having an amplitude VDD (5 V in this case) nearly equal to the first supply voltage and having a high frequency of several MHz are supplied from a clock pulse source 6 through a first capacitor 7 as a coupling capacity. The voltage of the node A is supplied to a node B which is an output node of the charge pump through a diode-connected second MOS transistor (hereinafter called second transistor) 2. Between the node B and the reference potential point, a second capacitor 8 is connected as the load capacity, and the voltage across the second capacitor 8 is delivered from an output terminal 9 after boosting through a fifth MOS transistor (hereinafter called fifth transistor) 11 which is an output MOS transistor. Meanwhile, the gate electrode of the third transistor 3 is connected to the node B, and the gate electrode of the fifth transistor 11 is connected to the gate electrode of the fourth transistor 10.

As clear from comparison between FIG. 1 and FIG. 3, the embodiment in FIG. 1 is composed by adding the fourth and fifth transistors 10, 11 to the conventional integrated high voltage generating system shown in FIG. 3.

The operation of the embodiment in FIG. 1 is explained below.

The first supply voltage is supplied to the node A through the first transistor 1, and hence the voltage VA of the node A is same as in equation (2), that is, $$VA = VG - (VT + \Delta VT) \quad (9)$$
$$= 5V - 2V$$
$$= 3V$$

At the node A, on the other hand, a clock pulse with amplitude VDD (5 V) is applied from the clock pulse source 6, and therefore the potential VA of the node A is raised to about 8 V at the moment a clock pulse rises up. This 8 V potential VA is supplied to the node B through the second transistor 2, so that the potential VB of the node B is same as in equation (3), that is, $$VB = VG - (VT + \Delta VT) \quad (10)$$
$$= 8V - 2V$$
$$= 6V$$

On the moment of rise of a clock pulse, the third transistor 3 is turned off, but along with the rise of a clock pulse as stated above, the second transistor 2 is turned on, and consequently as the clock pulse falls, the second transistor 2 is turned on, and thereby the potential VB of the node B is raised to about 6 V by the electric charge accumulated in the second capacitor 8, so that the third transistor 3 is turned on. As a result, the second supply voltage Vp (15 V) applied to the second power source input terminal 5 is supplied to the node A through the fourth transistor 10 and the third transistor 3. At this time, the potential VC of the node C is expressed as follows:

$$VC = VG - (VT + \Delta VT) \quad (11)$$
$$= 15V - 2V$$
$$= 13V$$

and the potential VA of the node A becomes as follows:

$$VA = VG - (VT + \Delta VT) \quad (12)$$
$$= 6V - 2V$$
$$= 4V$$

As evident by comparing equation (9) and equation (12), the potential VA of the node A was 3 V before the rise of the clock pulse, it is boosted to 4 V when the clock pulse once rises and then falls. In this period, the potential VB of the node B is raised to 6 V, and this voltage is taken out from the output terminal 9 as the output voltage.

Thus, in the embodiment in FIG. 1, too, as the second and third transistors 2, 3 alternately repeat switching actions in synchronism with the clock pulses, the potential VA of the node A is sequentially boosted stepwise, and accordingly the potential VB of the node B is also sequentially boosted stepwise. As a result, a stepwise boosted output voltage is delivered from the output terminal 9. The output voltage from the output terminal 9 is finally boosted nearly to the same potential as the second supply voltage Vp (15 V), and this voltage is applied to the gate electrodes of MNOS transistors composing the EEPROM (not shown).

Meanwhile, also in the embodiment in FIG. 1, when a power source of a small current sink capacity is connected to the second power source input terminal 5, the potential VC of the node C varies depending on the clock pulse supplied through the first capacitor 7. However, when the fourth and fifth transistors 10, 11 are added as in the embodiment in FIG. 1, influences by this variation may be eliminated.

The reason is explained below.

In synchronism with the clock pulses, the second and third transistors 2, 3 alternately repeat switching actions to gradually boost the first supply voltage from the first power source input terminal 4. Suppose the potential VB of the node B becomes nearly equal to the second supply voltage Vp. At this time, assuming the fluctuation amplitude of the potential VC of the node C due to clock pulse to be $\Delta V$, the potential VC of the node C is as follows:

$$VC = VG - (VT + \Delta VT) + \Delta V \quad (13)$$
$$= VP - (VT + \Delta VT) + \Delta V$$

Thereafter, in the same operation as stated above, the potential VB of the node B becomes $$VB = VP + \Delta i V \ldots (14)$$

and the influence of the fluctuation amplitude $\Delta V$ appears on the drain electrode (input side) of the fifth transistor 11.

However, at the gate electrode of the fifth transistor 11, the second supply voltage Vp fed from the second power source input terminal 5 is directly applied. Still more, from equation (14), the potential VD of the drain electrode is Vp+$\Delta V$. Therefore, the fifth transistor always satisfies the condition of $$VD \geq VG.$$

As a result, in the fifth transistor 11, equation (1) is always established, and hence $$VS = VG - (VT + \Delta VT) \quad (15)$$
$$= VP - (VT + \Delta VT)$$

As obvious from equation (15), the output voltage taken out of the output terminal 9 is determined by only Vp, VT, and $\Delta VT$, and it is free from the influence of amplitude fluctuation $\Delta V$.

Thus, according to the first embodiment, a stable output voltage may be always obtained without being affected by the amplitude fluctuation $\Delta V$ due to clock pulses.

Figure 2:
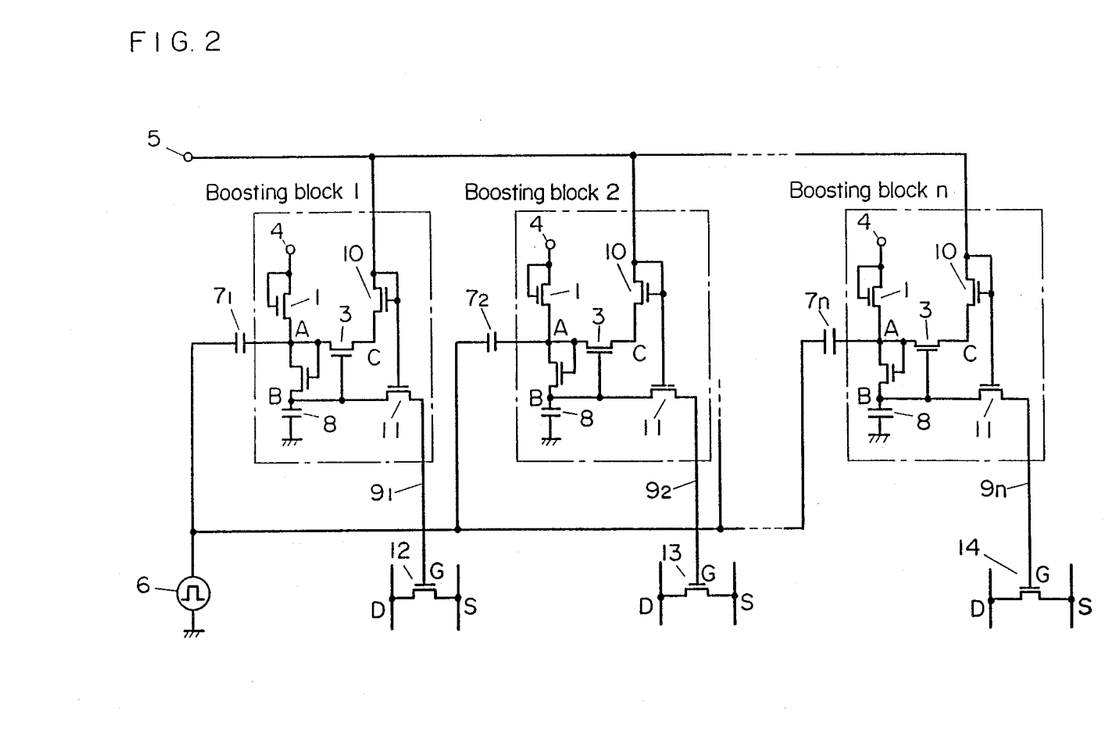
FIG. 2 is a circuit diagram of an integrated high voltage generating system in a second embodiment of the invention.

FIG. 2 shows an integrated high voltage generating system connecting n stages of the integrated high voltage generating system shown in FIG. 1 as a boosting block. In FIG. 2, the boosting blocks 1 to n correspond to the integrated high voltage generating system in FIG. 1 individually. The output lines 9l to 9n of the boosting blocks 1 to n are connected to the gate electrodes of the MNOS transistors 12 to 14 composing the EEPROM.

Even if the clock pulses are supplied to the boosting blocks 1 to n, by connecting plural boosting blocks 1 to n in cascade, from the common clock pulse source 6 through the first capacitors 7l to 7n, respectively, as evident from the operating principle in FIG. 1, the output voltages of the output lines 9l to 9n of the boosting blocks 1 to n are always fixed at $$Vp - (VT + \Delta VT)$$

which is determined by the second supply voltage Vp, the threshold voltage VT of the fifth transistor 11, and the back bias effect $\Delta VT$, and hence the effect of fluctuations due to clock pulses does not appear. Therefore, even if plural integrated high voltage generating systems differing in the number of stages are incorporated in a semiconductor device depending on the number of bits, the problem of fluctuation of the output voltage depending on the number of boosting blocks does not occur in the intergrated high voltage generating system.

We claim:

1. An integrated high voltage generating system comprising:
   a charge pump for boosting stepwise the potential of an output node sequentially from the value of a first supply voltage to the value of a second supply voltage in synchronism with clock pulses applied through a capacitor;
   an output MOS transistor connected between said output node and an output terminal; and
   gate voltage supply means for supplying said second supply voltage to the gate electrode of said output MOS transistor.

2. An integrated high voltage generating system according to claim 1, wherein said gate voltage supply means comprises:
   a diode-connected input MOS transistor connected between a second supply voltage input terminal and an input node of said charge pump; and means for connecting a gate electrode of said input MOS transistor and a gate electrode of said output MOS transistor.

3. An integrated high voltage generating system comprising:
a diode-connected first MOS transistor connected between a first supply voltage input terminal and a first node;
a diode-connected second MOS transistor connected between said first node and a second node;
a clock pulse source;
a first capacitor connected between said clock pulse source and said first node;
a second capacitor connected between said second node and a reference potential point;
a third MOS transistor connected between said first node and a third node;
a diode-connected fourth transistor connected between said third node and a second power source input terminal;
a fifth MOS transistor connected between said second node and an output terminal;
means for connecting a gate electrode of said third MOS transistor and said second node; and
means for connecting said second supply voltage input terminal and a gate electrode of said fifth MOS transistor.

4. An integrated high voltage generating system comprising:
a clock pulse source;
plural capacitors connected to said clock pulse source,
plural charge pumps for boosting stepwise the potential of an output node sequentially from the value of a first supply voltage to the value of a second supply voltage in synchronism with the clock pulses supplied from said clock pulse source through said capacitors;
an output MOS transistor connected between said output node and an output terminal in each charge pump; and
gate voltage supply means for supplying said second supply voltage to a gate electrode of said output MOS transistor in each charge pump.

5. An integrated high voltage generating system according to claim 4, wherein said gate voltage supply means comprises:
a diode-connected input MOS transistor connected between said second supply voltage input terminal and an input node of each charge pump; and
means for connecting a gate electrode of said input MOS transistor and a gate electrode of said output MOS transistor.

* * * * *